United States Patent [19]

Clerc et al.

[11] Patent Number: 4,752,774
[45] Date of Patent: Jun. 21, 1988

[54] CONTROL PROCESS FOR A MATRIX DISPLAY MEANS DISPLAYING GREY LEVELS

[75] Inventors: Jean-Frédéric Clerc, St. Egreve; Denis Sarrasin, Rives, both of France

[73] Assignee: Commissariat a l'Energie Atomique, Paris, France

[21] Appl. No.: 848,298

[22] Filed: Apr. 4, 1986

[30] Foreign Application Priority Data

Apr. 4, 1985 [FR] France ............... 85 05146

[51] Int. Cl.$^4$ .............................................. G09G 3/36
[52] U.S. Cl. ..................................... 340/784; 340/793; 340/805
[58] Field of Search ............... 340/784, 793, 805, 811; 350/332, 333; 358/241

[56] References Cited

U.S. PATENT DOCUMENTS

| | | | |
|---|---|---|---|
| 4,117,472 | 9/1978 | Freer et al. | 340/805 |
| 4,180,813 | 12/1979 | Yoneda | 340/793 |
| 4,427,978 | 1/1984 | Williams | 340/793 |
| 4,427,979 | 1/1984 | Clerc et al. | 340/793 |
| 4,560,982 | 12/1985 | Sonchara et al. | 340/805 |

FOREIGN PATENT DOCUMENTS 0051521 10/1981 European Pat. Off. .
2256588 10/1974 France .

Primary Examiner—Gerald L. Brigance
Attorney, Agent, or Firm—Cesari and McKenna

[57] ABSTRACT

A process for the control of a matrix display such as a liquid crystal display displaying grey levels comprising a display material inserted between m electrode rows and p electrode columns which cross the rows, a material zone $M_iN_j$ being excited by the application to row $M_i$ of a first series of pulse signals and to column $N_j$ of a second series of continuous signals, with i,j being integers such that $1 \leq i \leq m$ and $1 \leq j \leq p$, said signals being cyclical of cycle T with polarity reversal at each half-cycle T/2, T/2 being subdivided into n time fractions equal to $2^{(k-1)}m\tau$, in which k is an integer such that $1 \leq k \leq n$ and $\tau$ a time interval useful for exciting the material, the signal of the second series having a maximum of 2 n polarity reversals over a cylcle T and for each time fraction being either in phase, or in phase opposition with the signal of the first series.

4 Claims, 2 Drawing Sheets

CONTROL PROCESS FOR A MATRIX DISPLAY MEANS DISPLAYING GREY LEVELS

BACKGROUND OF THE INVENTION

The present invention relates to a control process for a matrix display means displaying grey levels. It more particularly applies to the field of optoelectronics and mainly to the control of liquid crystal cells, used as converters of electrical information into optical information for the real time processing of optical images and for analog display purposes.

FIG. 1a diagrammatically shows a cross bar matrix display means according to the prior art, while FIG. 1b is an exploded view thereof.

FIG. 1a shows two facing insulating walls 1, 3, which are kept spaced from one another by a seal 2 located on their peripheries and between which is introduced a material 4 having an optical feature such as an opacity, transparency, absorption, diffusion or birefringence.

Over the inner face of wall 1 is distributed a first group of m parallel electrodes $M_i$, with i being an integer such that $1 \leq i \leq m$, constituted by continuous conductive strips, while over the inner face of the other wall 3 is distributed a second group of p parallel electrode columns $N_j$, with j being an integer such that $1 \leq j \leq p$ and also constituted by conductive strips, the m rows and p columns of electrodes crossing one another. These m rows and p columns of electrodes respectively serve to carry row signals and column signals appropriate for the excitation of material 4. This excitation can be electrical, magnetic or thermic and is dependent on the material 4 inserted between the electrode rows and columns. The excitation signals are produced in a continuous manner by a power supply source 6.

FIG. 1b, which is an exploded view of the display means, shows the first group of m electrode rows $M_i$ and the second group of p electrode columns $N_j$ distributed respectively on walls 1 and 3. The m rows and p columns of electrodes cross, so that a zone $M_iN_j$ of material is defined by the overlap region of row $M_i$ and column $N_j$. Each zone $M_iN_j$ defines an elementary image point of the display means, the latter thus having mxp image points distributed in matrix-like manner.

In a particular case of the liquid crystal, for example, excitation is of an electrical type. Thus, the application of voltages to rows $M_i$ and columns $N_j$ of the electrodes produces an electric field within the liquid crystal in the corresponding overlap zones $M_iN_j$ leading to a collective orientation of the liquid crystal molecules in said zones.

By utilizing the selective orientation of the molecules and the point-by-point excitation of the liquid crystal, an image appears on the complete display means while defining same in point-by-point manner.

The timing diagram of FIG. 2 makes it possible to understand the known control principle of a matrix display means making it possible to display grey levels. Signal A represents the voltage applied to a row electrode $M_i$. Signals B, C and D represent the different voltages applied to a column electrode $N_j$ as a function of the desired display.

Signal A, B, C and D are square-wave signals of alternately positive and negative amplitude and consequently of zero mean value. The polarity inversion of these signals makes it possible to protect the display material, particularly the liquid crystal from direct currents and, consequently, to extend its life. Signal A is a pulse signal of cycle T, T being generally approximately 40 ms. Signal A is non-zero solely during a row time $T_L$ and its polarity is reversed at half of time $T_L$. Time $T_L$ is equal to the cycle T divided by the number of rows m of the display means: $T_L = T/m$.

Each of the rows of the display means thus receives a row signal identical to that shown in FIG. 2 at A, but delayed by a time $t \times T_L$ with respect thereto, t being an integer such that $1 \leq t \leq m-1$.

The column signals B, C and D are continuous and are amplitude signals which are successively positive, then negative and having an amplitude below that of the row signals. The amplitude of these signals has a rising front 11 and a falling front 13 for each row time $T_L$ and 2m fronts on the complete time T, m corresponding to the number of rows. The column signal B is in phase opposition with the row signal A during the first time $T_L$ of cycle T.

The resulting signal, during this first time $T_L$ in a zone $M_iN_j$ corresponding to the overlap of a row $M_i$ to which is applied the row signal A and a column $N_j$ to which is applied the column signal B, is a signal whose amplitude is the sum of the amplitudes in absolute values of the row signal A and the column signal B. The resulting amplitude exceeds that of the threshold voltage $V_s$ of the liquid crystal, $V_s$ corresponding to the minimum voltage required for exciting the liquid crystal. Thus, in this overlap zone $M_iN_j$, the appearance of an electric field will bring about an orientation of the liquid crystal molecules in said zone $M_iN_j$ and the display of a white point.

Over the remainder of the time T, as the row signal A is zero, the resulting signal will be that of the column signal B. The amplitude of a column signal is below the amplitude of the threshold voltage, so that the resulting signal is inadequate for exciting the material. Moreover, the resulting display is that obtained during the first row time $T_L$, i.e. white, the signal being stored for the remainder of the time T. Column signal C is identical to signal B, but is of reverse polarity. It is therefore in phase with the row signal A during the first time $T_L$.

The resulting signal during this time $T_L$ in a zone $M_iN_j$ corresponding to the overlap of a row $M_i$, to which is applied a row signal a, and a column $N_j$ to which is applied a column signal C, is a signal, whose amplitude is the difference between the amplitudes, in absolute values, of row signal A and column signal C. The resulting amplitude is consequently below that of the threshold voltage $V_s$. Thus, in the overlap zone $M_iN_j$, the liquid crystal is not excited and a black point is displayed.

As hereinbefore, over the remainder of time T, the resulting signal is that of the column signal C, so that the resultant display remains black.

The column signal D is identical to signal C, but is delayed by a time $\delta$ with respect thereto with $\delta < T_L$.

Signal D is intermediate between signal B and signal C. For a row time $T_L$, it is twice in succession in phase and then in phase opposition with the row signal A. At the intersection point $M_iN_j$ of a row $M_i$, to which is applied the row signal a, and a column $N_j$, to which is applied a column signal D, there is consequently a grey display.

The phase difference $\Delta\phi$ between the row signal applied to a row $M_i$ and a column signal B, C or D applied to a column $N_j$ determines the display state of the image point $M_iN_j$:

$$\Delta\phi = 2\pi(\delta/T_L)$$

Thus, when $\Delta\phi=0$, point $M_iN_j$ is black, when $\Delta\phi=180°$ point $M_iN_j$ is white and finally when $0<\Delta\phi<180°$ point $M_iN_j$ is grey.

By varying $\Delta\phi$, i.e. by varying the time lag $\delta$ of the column signal, it is possible to obtain different grey levels. The 2m fronts of the different column signals B, C and D at each cycle T lead to coupling phenomena between the rows and columns, causing a deterioration of the displayed image.

In order to reduce the coupling phenomena, in known manner the number of column signal fronts for each cycle T is reduced. The timing diagram of FIG. 3 shows the different signals applied to the electrode columns and rows in accordance with a known control process making it possible to reduce coupling phenomena. Signal E represents the signal applied to a row electrode $M_i$ and signals F, G and H represent the signals applied to a column electrode $N_j$ in accordance with the desired display. These signals are square-wave, cyclic signals of cycle T and undergo a polarity reversal for each half-cycle T/2.

The row signal E is of a pulse type and is non-zero for a row time $T_L = T/(2.m)$, m representing the number of rows of electrodes of the display means. To each row $m_i$ is applied a row signal of the same type as row signal E, but delayed by a time $t \times T_L$ compared with that with $1 \leq t \leq m-1$.

The column signal F is continuous and only has two fronts per cycle T. It is in phase opposition with the pulse of row signal E and consequently permits a white display.

In the same way, column signal G is continuous and has two fronts per cycle. It is in phase with the pulse of row signal E and permits a black display.

However, for a grey display, the corresponding column signal H must retain for each time $T_L$ at least one rising front 15 and on falling front 17 to be successively in phase and in phase opposition with the different pulses of the row signal. Thus, the column signal has $2(m-1)$ fronts on a cycle T.

The column signal H is delayed by a time $\delta$ compared with the row signal E. The phase difference $\Delta\phi$ between these signals is given by the following relation:

$$\Delta\phi = \pi(\delta/T_L)$$

Thus, the grey display also leads to coupling phenomena between the electrode rows and the electrode columns to which a column signal H is applied.

Patent application No. 8 022 930 of Oct. 27, 1980 describes a control process making it possible to display several grey levels. In this process, on electrode rows are applied cyclical signals of cycle T and zero mean value. For each cycle T, these signals are divided into n different time fractions, so that the kth time fraction is equal to $2^{k-1}\tau$, in which k is an integer such that $1 \leq k \leq n$ and $\tau$ is a time interval useful for exciting the material, each time fraction being followed by a dead time u.

To the electrode columns are applied further cyclical signals of cycle T and zero mean value. These signals are also divided into n time fractions, so that the kth time fraction is of the same duration as the kth time fraction of the row signals, said column signals being either in phase, or in phase opposition therewith.

In this control process permitting the display of several grey levels, there are significant coupling phenomena between the rows and columns of electrodes leading to a deterioration of the image displayed.

SUMMARY OF THE INVENTION

The object of the present invention is to obviate these disadvantages and more particularly decrease the couplings between the rows and columns of electrodes of a display means by distributing n different time fractions in successive pulse addressing sequences and not in a continuous row signal as in the previously-described known control process.

More specifically, the present invention relates to a process for the control of a matrix display means, which displays grey levels and comprising a display material, whereof it is possible to modify an optical characteristic inserted between a first group of m parallel rows of electrodes $M_i$ and a second group of p parallel columns of electrodes $N_j$, i and j being integers such that $1 \leq i \leq m$ and $1 \leq j \leq p$, the rows and columns crossing, one zone $M_iN_j$ of the material being defined by the region of the material covered by row $M_i$ and column $N_j$, the rows and columns of electrodes carrying signals causing an excitation of the material, wherein for exciting material zone $M_iN_j$, to row $M_i$ is applied a first series of pulse signals and to column $N_j$ is applied a second series of continuous signals, the first and second series of signals being cyclical, of cycle T, with polarity reversal in each half-cycle T/2, each half-cycle being subdivided into n different time fractions, such that at each time fraction, the signal of the second series is either in phase, or in phase opposition with, the signal of the first corresponding series, the signal of the second series having a maximum of 2n polarity reversals over a cycle T.

According to a control mode, the n different time fractions are such that the kth time fraction is equal to $2(k-1)m\tau$, in which k is an integer such that $1 \leq k \leq n$, m representing the number of rows of the display means and $\tau$ a time interval useful for the excitation of the material.

According to another control mode, a non-zero row signal of duration $2^{(k-1)}\tau$ corresponds to each time fraction k.

According to another control mode the n time fractions have decreasing durations $2^{(k-1)}m\tau$ varying in decreasing manner from n to 1.

According to a variant of the control process, the n time fractions have increasing durations $2^{(k-1)}m\tau$, k varying in increasing manner from 1 to n.

According to a preferred mode of the control process, the signals applied to the rows and columns of electrodes are square-wave signals.

According to another preferred mode of the control process, the display material is a liquid crystal film, the exciting signals applied to the rows and columns of electrodes being voltages.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1A:
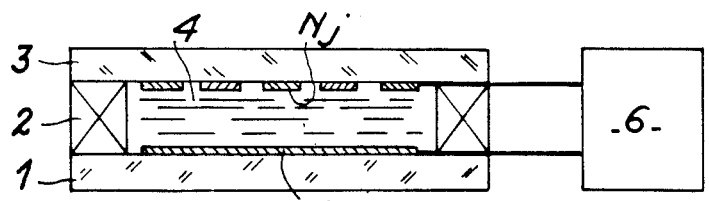
FIGS. 1a and 1b, already described, diagrammatically in section and in exploded view, a crossbar matrix display means.
Figure 1B:
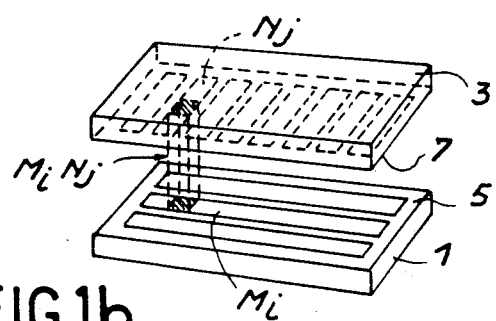
Figure 2:
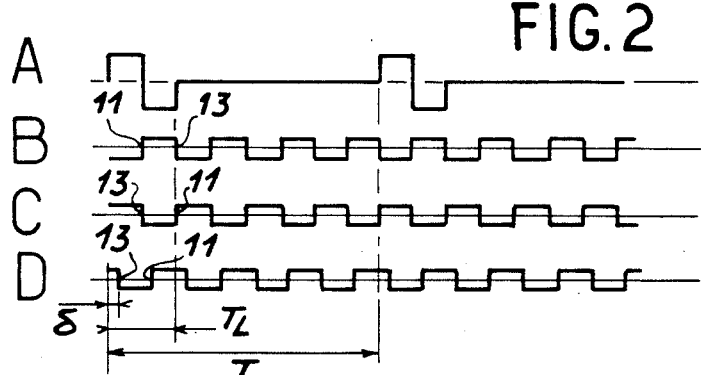
FIG. 2, already described, a timing diagram of the different signals applied to the electrodes of a display means according to a prior art process.
Figure 3:
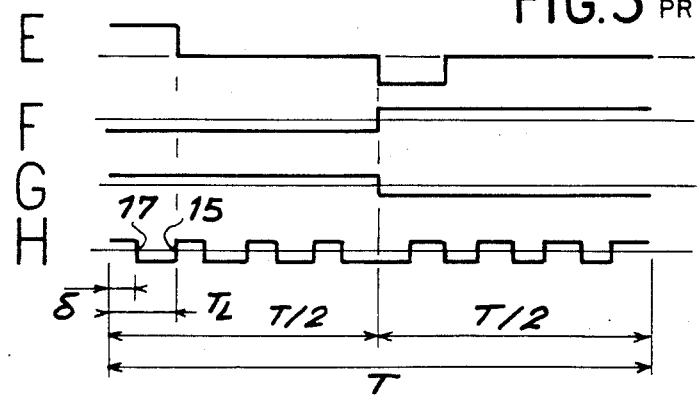
FIG. 3, already described, a timing diagram of the different signals applied to the electrodes of a display means making it possible to reduce part of the couplings between the row electrodes and column electrodes according to a known control principle.
Figure 4:
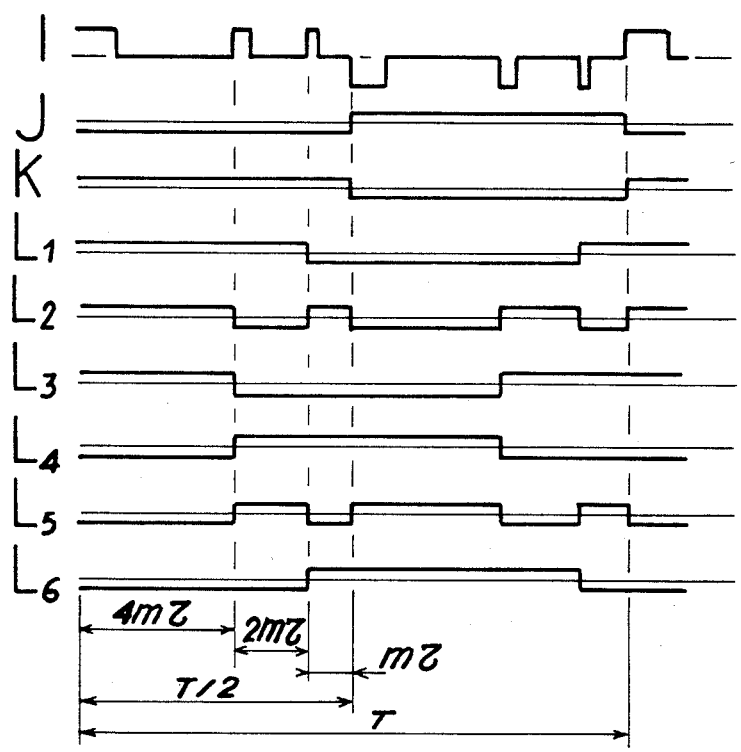
FIG. 4, the timing diagram of the signals applied to the row and column electrodes according to the control process of the invention.

FIG. 4 shows a row signal I applied to a row electrode $M_i$ and column signals J, K, $L_1$, $L_2$, $L_3$, $L_4$, $L_5$ and $L_6$ applied to a column electrode $N_j$, in accordance with the desired display. Signal j permits the white display, signal K the black display and signals $L_g$, with g being an integer such that $1 \leq g \leq 6$ in the present case, permit the display of 6 different grey levels.

These signals are of a cyclical nature, of cycle T and with polarity reversal for each half-cycle T/2. The signals shown are of a square-wave type, but could also be sinusoidal. Each half-cycle is divided, according to the inventive process, into n different time fractions, each time fraction k having a duration $2^{(k-1)}m\tau$, in which k is an integer such that $1 \leq k \leq n$, m representing the number of rows of the display means and $\tau$ a time interval useful for the excitation of the material, particularly the liquid crystal. These n time fractions are distributed over each half-cycle T/2 either with increasing duration, k varying from 1 to n, or with decreasing duration as in the example of the drawing FIG. 4, k varying from n to 1.

The row signal I is of the pulse type and is not zero over each time fraction $2^{(k-1)}m\tau$ during 1/mth of this time, i.e. during $2^{(k-1)}\tau$ called row time $T_L$. The m rows of the cell each receive a signal of the same type as that shown at I, but delayed by $t \times T_L$ with $1 \leq t \leq (m-1)$.

In the example of FIG. 4, each half-cycle is divided into three time fractions (n=3) of decreasing duration, k successively assuming the values 3, 2 and 1. Thus, these three time fractions have respective durations $4m\tau$, $2m\tau$ and finally $m\tau$. Thus, the row signal I is not zero each each fraction k for 1/mth of this time, i.e. for a time respectively $4\tau$, $2\tau$ and $\tau$.

The column signal J is continuous and of negative amplitude for the first half-cycle T/2 and then positive for the second half-cycle T/2. Thus, said signal J is in phase opposition with the row signal I whenever the latter is not zero. The superimposing of a row signal and the column signal J consequently makes it possible to display white.

In the same way, column signal K is continuous, but of positive amplitude during the first half-cycle T/2 and then negative for the second half-cycle T/2. Thus, signal K is in phase with the non-zero pulses of the row signal I. The superimposing of a row signal and the column signal K consequently makes it possible to display black. The different signals $L_j$ with $1 \leq g \leq 6$ are intermediate of signals j and K. These signals are continuous and of alternately positive and negative amplitudes over a half-cycle T/2, the polarity change taking place on passing from one time fraction to the next. Thus, each signal $L_j$ is at least once in phase and in phase opposition with each of the row signals over a half-cycle T/2.

In the example of the drawing FIG. 4, as each half-cycle is subdivided into three time fractions, the number of fronts of these column signals does not exceed the number 3. Thus, there are six ways of varying the polarity of a signal in order to have different column signals $L_j$ and having at least one positive and negative amplitude over a half-cycle T/2. Thus, these signals $L_g$ make it possible to display six different grey levels.

Therefore, for n time fractions, there are $2^n$ column signals, whereof one column signal makes it possible to display white and another black. For n time fractions, it is consequently possible to have $2^n - 2$ column signals permitting the grey display. The choice of n makes it possible to obtain a larger or smaller number of grey levels.

Each of the column signals has a number of fronts equal to or lower than 2n for a cycle T, n representing the number of time fractions dividing a half-cycle T/2. Thus, this control process makes it possible to reduce the number of fronts of column signals compared with the prior art processes and consequently to reduce couplings between rows and columns.

What is claimed is:

1. A control process of an optical characteristic of a material for obtaining a display of $2^n$ different levels, said material having a plurality of zones distributed in a matrix-like manner and interposed between a first group of m rows and a second group of p columns of parallel electrodes, the rows and the columns being crossed, a zone MiNj of said material being defined by the rgion of the material covered by row Mi and column Nj, i and j being integers such that $1 \leq i \leq m$ and $1 \leq j \leq p$, wherein for controlling the zone MiNj of the material the process includes:

applying a first series of signals on row Mi for a half-cycle duration;

applying a second series of signals on column Nk for said half-cycle;

dividing said half-cycle into n different time fractions of different durations;

giving to said first series of signals applied on row Mi, in each of said time fractions, an amplitude of a given first polarity for a duration equal to 1/m of the duration of said time fraction and a null amplitude for the remaining portion of said time fraction;

giving to said second series of signals applied on column Nj a continuous amplitude for the entirety of a time fraction, said amplitude having a given second polarity, said second polarity being the same as or opposite to said first polarity;

allowing change of said second polarity only when passing from one time fraction to the next;

selecting said second series of signals from among a series of $2^n$ signals corresponding to the $2^n$ possible combinations of n successive time fractions having a given polarity; and reversing said first and second polarities after each half-cycle.

2. A control process according to claim 1, wherein the n different time fractions are such that the $k^{th}$ time fraction is equal to $2^{k-1}m\tau$, in which $\tau$ is a time interval useful for exciting the material.

3. A control process according to claim 1, wherein the signals applied to the rows and columns of electrodes are square-wave signals.

4. A control process according to claim 1, wherein the material is a liquid crystal film, the exciting signals applied to the rows of electrodes and columns of electrodes being voltages.

* * * * *